(12) United States Patent
Reiland et al.

(10) Patent No.: US 6,464,238 B2
(45) Date of Patent: Oct. 15, 2002

(54) PASSENGER CARRIER THAT NESTS WITH A CART BASKET

(75) Inventors: Mary J. Reiland, Apple Valley; David Lehse, Oakdale, both of MN (US)

(73) Assignee: Four D, Inc., Burnsville, MN (US)

( * ) Notice: Subject to any disclaimer, the term of this patent is extended or adjusted under 35 U.S.C. 154(b) by 0 days.

(21) Appl. No.: 09/822,883

(22) Filed: Mar. 30, 2001

(65) Prior Publication Data

US 2001/0035619 A1 Nov. 1, 2001

Related U.S. Application Data

(60) Provisional application No. 60/193,738, filed on Mar. 31, 2000.

(51) Int. Cl.$^7$ .............................................. B62D 39/00
(52) U.S. Cl. .............................. 280/33.993; 280/47.34; 297/256.17; 297/248
(58) Field of Search ...................... 280/33.991, 33.992, 280/33.993, 33.994, 33.995, 33.996, 33.997, 33.998, 47.26, 47.34, 47.35, 651, 47.25; 297/256.17, 118, 130, 248, 250.1, 227; 180/14.1, 14.2, 14.3, 14.4, 14.6, 14.7; D34/12, 27

(56) References Cited

U.S. PATENT DOCUMENTS

| 2,420,088 A | 5/1947 | Milburn |
| 2,997,311 A | 8/1961 | Umanoff |
| 3,044,801 A | 7/1962 | Vicany |
| 3,497,234 A | 2/1970 | Schray |
| 3,575,250 A | 4/1971 | Dykes |
| 3,834,726 A | 9/1974 | Hobza |
| 3,953,046 A | 4/1976 | Johansson |
| 4,305,601 A | 12/1981 | Berge |
| 4,484,755 A | 11/1984 | Houston |
| D281,365 S | 11/1985 | Gugler |
| 4,555,124 A | 11/1985 | Millington |
| 4,610,454 A | 9/1986 | Gill |
| 4,650,199 A | 3/1987 | Rehrig |
| 4,706,975 A | 11/1987 | Arena et al. |
| 4,771,840 A | 9/1988 | Keller |
| 4,993,670 A | 2/1991 | Tesar |

(List continued on next page.)

FOREIGN PATENT DOCUMENTS

| DE | 42 02 428 A1 | 6/1992 |
| DE | 42 19 121 A1 | 12/1993 |
| DE | 43 17 228 A1 | 12/1993 |
| EP | 513839 | * 11/1992 |
| GB | 2 025 860 A | 1/1980 |

OTHER PUBLICATIONS

"mart cart 1", Shopper's Aid, Marketed by Mart Cart, Brochure.
Consumer Product Safety Alert. From the U.S. Consumer Product Safety Commission, Washington, D.C. 20202. Mar. 1990. Falls from Shopping Carts Cause Head Injuries to Children.

*Primary Examiner*—Brian L. Johnson
*Assistant Examiner*—Bryan Fischmann
(74) *Attorney, Agent, or Firm*—Faegre & Benson LLP (57) ABSTRACT

An apparatus including a passenger carrier attached to a cart. The cart includes a support structure and a cart basket. The passenger carrier includes a seat portion. The apparatus includes a first set of swivel caster wheels near a front portion of the apparatus, a second set of non-swivel caster wheels located generally where the passenger carrier is connected to the cart, and a third set of swivel caster wheels located near a rear portion of the apparatus. The apparatus includes an upper portion in a first position that can be displaced to a second position to form an opening sized to receive a front portion of another cart basket in a nested configuration.

37 Claims, 9 Drawing Sheets

U.S. PATENT DOCUMENTS

| | | |
|---|---|---|
| 5,011,169 A | 4/1991 | Henderson et al. |
| D318,550 S | 7/1991 | Stefano |
| 5,076,599 A | 12/1991 | Lockett et al. |
| 5,149,114 A | 9/1992 | Lewandowski et al. |
| D330,103 S | 10/1992 | Andrews, Jr. et al. |
| 5,176,395 A | 1/1993 | Garforth-Bles |
| 5,188,389 A | 2/1993 | Baechler et al. |
| 5,203,578 A | 4/1993 | Davidson et al. |
| 5,263,726 A | 11/1993 | Wood |
| 5,277,473 A * | 1/1994 | Kelly et al. ......... 280/22.993 X |
| 5,312,122 A | 5/1994 | Doty |
| D356,414 S | 3/1995 | Fridolph |
| D357,105 S | 4/1995 | Reiland et al. |
| 5,641,200 A | 6/1997 | Howell |
| 5,823,548 A | 10/1998 | Reiland et al. |
| 5,882,021 A | 3/1999 | Reiland et al. |
| 6,022,031 A | 2/2000 | Reiland et al. |
| 6,050,637 A * | 4/2000 | Haland et al. |
| 6,270,093 B1 * | 8/2001 | Johnson ................. 280/33.993 |
| 6,312,049 B1 * | 11/2001 | Sullivan et al. |

* cited by examiner

Fig. 9

PASSENGER CARRIER THAT NESTS WITH A CART BASKET

This application claims the benefit of U.S. Provisional Application serial No. 60/193,738 filed Mar. 31, 2000.

FIELD OF THE INVENTION

The present invention relates to a passenger carrier attachable to a hopping or a luggage cart that nests with a cart basket of another cart. The present invention is also directed to an assembly comprising a passenger carrier and a cart. The passenger carrier and cart can be separate attachable components or a unitary structure.

BACKGROUND OF THE INVENTION

Shopping carts found in retail establishments generally include a child seat that is part of the rear panel of the shopping cart basket. A back support panel is attached to the rear panel, usually on the inside of the basket, thereby reducing the carrying capacity of the shopping cart. A fold down seat portion traverses the back support panel and the rear panel to form the child set proximate the upper portion of the rear panel. Generally, the child seat is arranged so that the child's legs extend through openings in the back panel. Airport luggage carts have a similar child seat arrangement. However, luggage carts generally weigh less than a shopping cart and are therefore more prone to tip over.

The child seats on shopping or luggage carts only have room for one child. Also, once a child reaches approximately 35 pounds, or is more than approximately 54" tall, the child seat on these carts starts to be too small and uncomfortable for the child. Additionally, children older than approximately 3 years find these seats confining and often attempt to climb out. Consequently, it is very common to see children riding in the basket portion of the shopping cart or standing on the front edge of the lower frame while gripping onto the basket portion, or standing on the luggage portion of a luggage cart.

Allowing a child to ride in the basket portion of the shopping cart has proven to be extremely dangerous. According to the U.S. Consumer Product Safety Commission, from 1985 to 1996 an annual average of 12,800 children ages five and under were treated in U.S. hospital emergency rooms for falls from shopping carts. In fact, fall-related injuries significantly increased during that period, rising from 7,800 in 1985 to more than 16,000 in 1996. Consumer Product Safety Commission data also show that during 1995 and 1996, two-thirds of the fall victims were treated for head injuries, and more than half of the head injury victims suffered severe head injuries such as concussions and fractures.

While old style shopping carts were constructed of metal, newer carts are utilizing more plastic parts, including cart baskets. Consequently, newer shopping carts generally weigh less than the older metal carts. Since the child seat is generally on the upper portion of the rear panel of the basket portion, a larger child will significantly alter the center of gravity of the cart, especially when the cart is empty. The reported accidents also include injuries resulting from children tipping over the cart by rocking back and forth. Finally, the seats built into shopping carts are not suitable for adults.

U.S. Pat. No. 3,575,250 (Dykes) and U.S. Pat. No. 4,771,840 (Keller) disclose motorized attachments for shopping carts. However, the motorized units are intended for disabled individuals, not children. The motorized units are cost prohibitive for a broad-based solution to the problem of child injuries relating to shopping carts. Both of the above patents disclose an articulated or pivotal joint between the carrier and the shopping cart that requires the passenger to steer the cart, a design totally impractical for a child passenger. Neither of the devices discussed above are nestable.

U.S. Pat. No. Des. 318,550 (Stefano) discloses a cart with an integrally formed occupant portion. The structure of Stefano does not include wheels supporting the rear of the cart and is not a viable option for use with the current inventory of shopping carts. Stefano does not teach nesting.

U.S. Pat. No. 4,305,601 issued to Berge discloses a shopping cart for use with wheelchairs. Berge does not teach nesting. An obvious drawback of the Berge device is that the user must overcome the inertia of both the cart (and it's contents) and the front portion of the wheelchair, all from a sitting position.

U.S. Pat. No. 3,044,801 (Vicany) discloses an occupant propelled shopping cart with pedals 58, 60 for providing the motive force. The rear wheel 24 can be steered using a handle 40. Vicany discloses the cart and the seat as an integral structure without wheels supporting the rear of the cart. Consequently, the structure of Vicany is not a viable option for use with the current inventory of shopping carts. Additionally, most small children and some adults would not be able to operate the pedals and steering mechanism. Finally, it is easy to imagine the difficulty of steering the device of Vicany while a small child riding on the device was manipulating the steering handle.

There are presently millions of conventional shopping and luggage carts in use. A shopping cart costs anywhere from $70.00 to $120.00. One approach to reducing child injuries is to utilize the existing inventory of carts with the passenger carrier disclosed in U.S. Pat. Nos. 5,823,548 (Reiland et al.); 5,882,021 (Reiland et al.) and 6,022,031 (Reiland et al.), each entitled Child Carrier Accessory Attachable to a Shopping or Luggage Cart. None of the structure disclosed above are nestable. What is needed is a passenger carrier for use with a shopping or luggage cart that permits the cart basket of one cart to nest with the passenger carrier of another cart.

SUMMARY OF THE INVENTION

The present invention relates to a passenger carrier attachable to a conventional shopping or luggage cart that does not significantly reduce the overall functionality of the cart. The passenger carrier nests with a cart basket of another cart. The present invention is also directed to an assembly comprising a passenger carrier and a cart. The passenger carrier and cart can be separate attachable components or a unitary structure.

In one embodiment, the apparatus comprises a passenger carrier having a seat portion and a cart basket. The apparatus is supported by a first set of wheels near a front portion of the cart basket, a second set of wheel supporting the apparatus generally near a location where the passenger carrier is connected to the cart basket and a third set of wheels supporting the passenger carrier. Only one of the first set of wheels, the second set of wheels and the third set of wheels comprise non-swivel caster wheels. The rest of the wheels are typically swivel casters.

The passenger carrier comprises an upper portion in a first position that can be displaced to a second position to form an opening sized to receive a front portion of another cart basket. The upper portion can rotate upward, downward or side ways. A biasing member can optionally be used to control the movement of the upper portion from the second position to the first position. The upper portion may or may not include the seat portion. The cart can be a shopping cart or a luggage cart.

The present invention is also directed to a method of nesting an apparatus comprising passenger carrier and a cart. A second cart basket is pressed against the upper portion of a first passenger carrier so that the upper portion is displaced to a second position forming an opening sized to receive a front portion of the second cart basket.

DETAILED DESCRIPTION OF THE INVENTION

Figure 1:
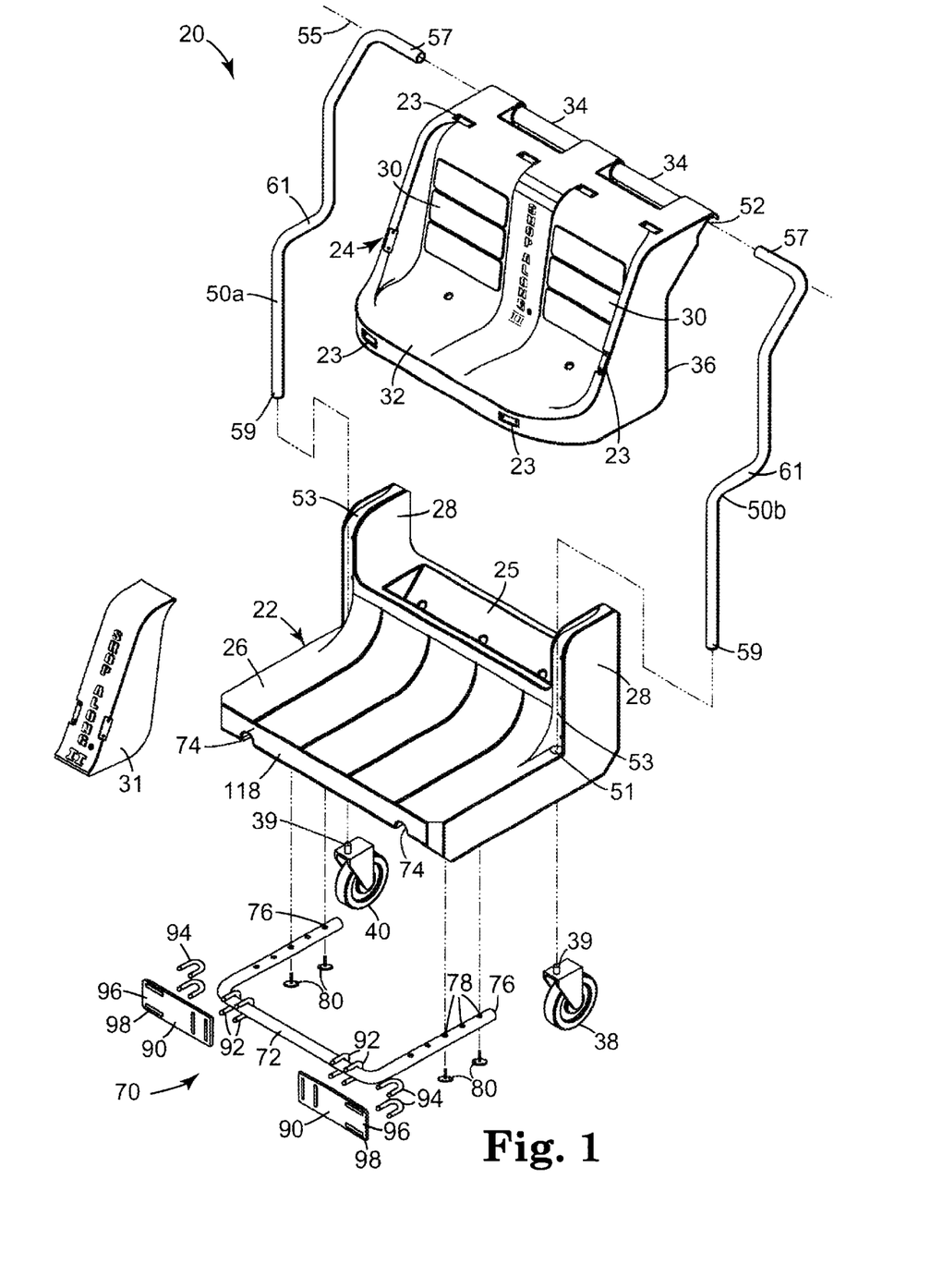
FIG. 1 is an exploded view of a passenger carrier in accordance with the present invention.

FIG. 1 is an exploded view of a first embodiment of a passenger carrier 20 in accordance with the present invention. Passenger carrier 20 includes a lower portion 22 and an upper portion 24. The lower portion 22 comprises a platform portion 26 and an optional first reinforcing member 28. Additional storage space 25 may be included in the lower portion 22. The first reinforcing member 28 is optionally located on the platform portion 26 directly under seat portion 32. In the illustrated embodiment, the platform portion 26 and the first reinforcing member 28 are part of a unitary structure. Alternatively, portions 26 and 28 may be separate components, preferably anchored together using a variety of techniques, such as fasteners, adhesives and the like.

In the illustrated embodiment, the upper portion 24 comprises a back rest portion 30 and a seat portion 32. Alternatively, the upper portion can optionally be just the back rest portion 30 (see FIG. 8). The upper portion typically includes various mounting locations 23 for attaching safety straps, such as disclosed in U.S. Pat. No. 5,823,548 (Reiland et al.).

A center divider 31 can optionally be attached to the upper portion 24. For example, if the passenger carrier 20 is intended for use by children, the center divider 31 may be desirable. If the passenger carrier 20 is intended for use by adults, the center divider 31 can be excluded.

One or more handles 34 are preferably provided near a rear surface 36 of the upper portion 24. As will be discussed below, the components forming the upper portion 24 and the lower portion 22 may vary, depending upon the particular application. For example, the seat portion 32 may be part of the lower portion 22. Alternatively, some or the entire first reinforcing member 28 may be part of the upper portion 24.

The platform portion 26, back rest portion 30 and seat portion 32 may be constructed of a variety of materials, such as plastic, metal, wood, or combinations thereof. For example, the platform portion 26 and first reinforcing member 28 may be a single blow molded or rotational molded plastic component. Similarly, the seat portion 32 and back rest portion 30 may also be a molded plastic part. Alternatively, each of the portions 26, 28, 30, 32 may be discrete components constructed from the same or different materials.

In the embodiment illustrated in FIG. 1, second reinforcing members 50a, 50b (referred to collectively as 50) optionally extend in channels 53 in the first reinforcing member 28. The portion 61 of the second reinforcing members 50 help support the upper portion 24 when in a first position (see FIG. 2). First distal ends 57 of the second reinforcing members 50 extend through recesses 52 in the back rest portion 30 to reinforce the handles 34. In the illustrated embodiment, second distal ends 59 of the second reinforcing members 50 extend through holes 51 in the lower portion 22 and optionally into swivel portions 39 of swivel caster wheels 38, 40. In some embodiments, use of the second reinforcing members 50 obviate the need for the first reinforcing member 28. Alternatively, the first and second reinforcing members 28, 50 can be formed as part of the same structure.

The passenger carrier 20 of FIG. 1 is supported by one or more swivel caster wheels 38, 40 (referred to herein as the "third set of wheels"). The swivel caster wheels 38, 40 have two degrees of freedom. First, the wheels 38, 40 rotate around horizontal axes respectively, as the passenger carrier 20 is propelled. Second, the swivel caster wheels 38, 40 rotate around vertical axes extending through the swivel portions 39 to permit the passenger carrier and cart 102 to be turned. As will be discussed below, the wheels 38, 40 may be non-swivel caster wheels in certain embodiments.

Figure 2:
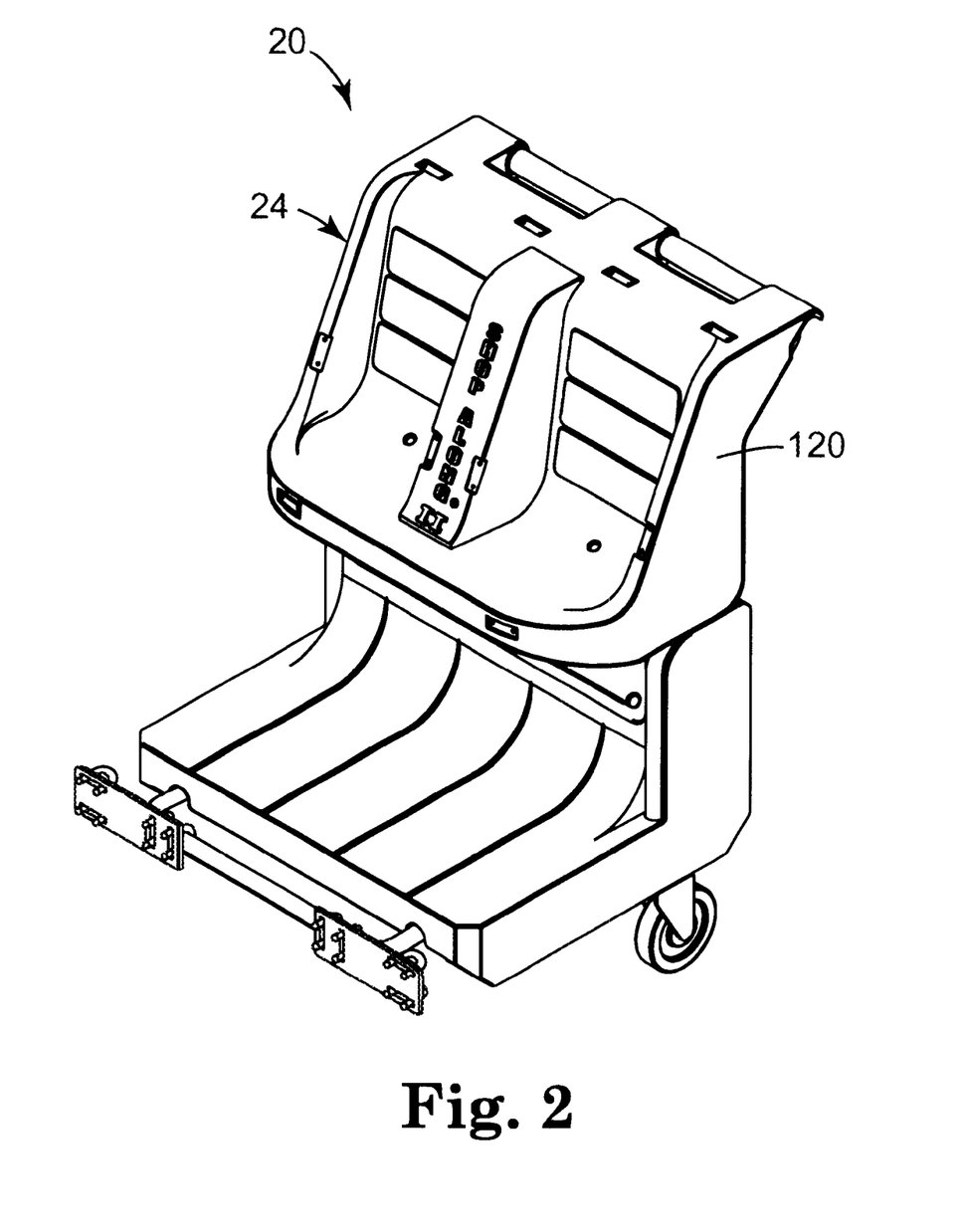
FIG. 2 is a perspective view of the passenger carrier of FIG. 1 in the first position.
Figure 3:
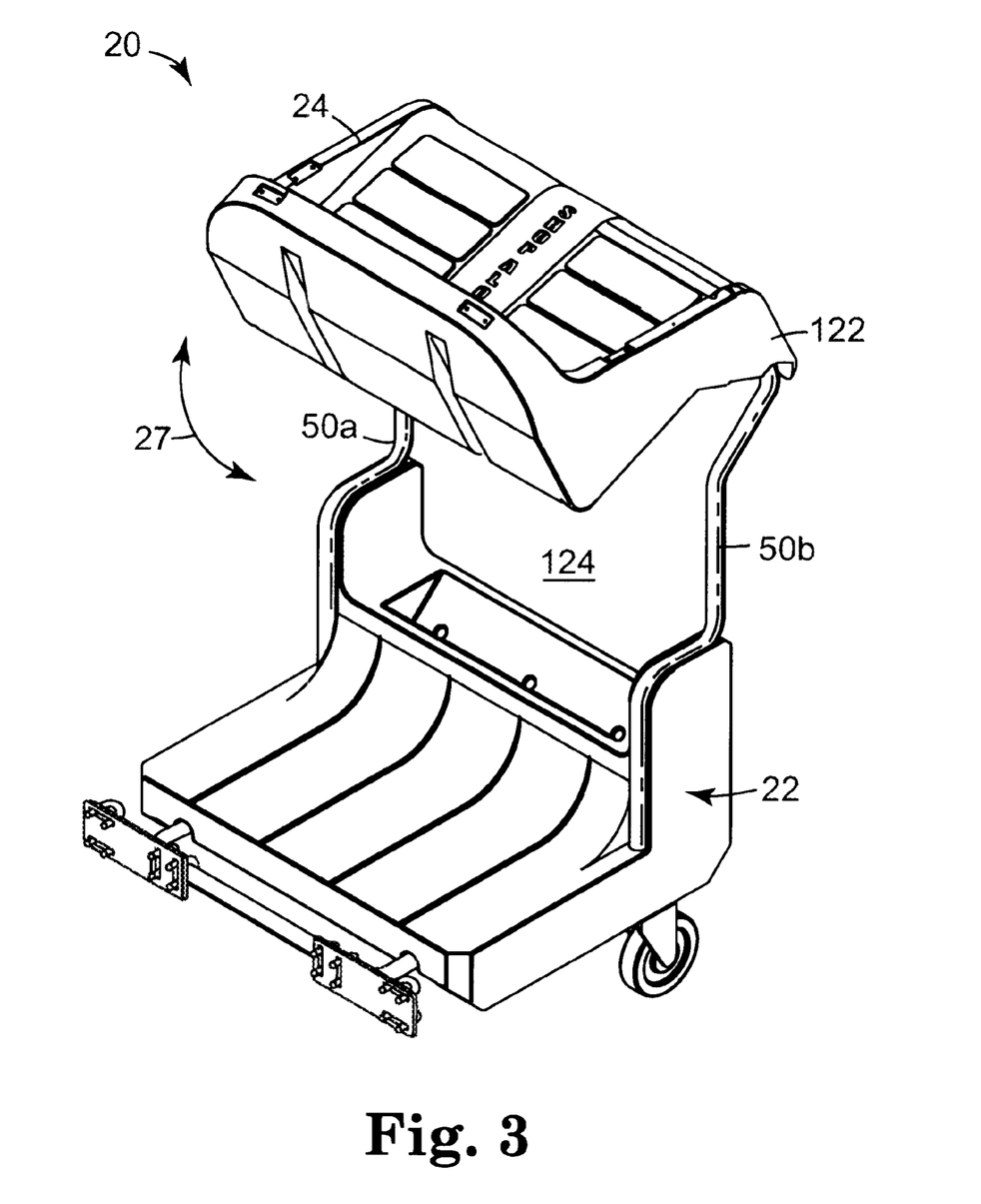
FIG. 3 is a perspective view of the passenger carrier of FIG. 1 in the second position.

The passenger carrier 20 of the present invention may be attached to the shopping or luggage cart 102 (see e.g., FIG. 4) using a variety of structures, such as the mounting assembly 70 illustrated in FIGS. 1–3. The mounting assembly 70 includes one or more mounting bars 72 that extends into recesses 74 in the platform portion 26. Distal portions 76 of the mounting bar 72 include a plurality of holes 78. Fasteners 80 can be used to attach the mounting bar 72 to the platform portion 26 at various locations using one or more of the holes 78. Fasteners 80 retain the mounting bar 72 to the platform portion 22, thereby determining how far the mounting bar 72 extends beyond the distal portion 118 of the platform portion 26. Consequently, the position of the mounting bar 72 relative to the platform portion 26 can be adjusted by sliding the mounting bar 72 along the recesses 74 to the desired position and engaging the appropriate fasteners 80 and holes 78.

One or more brackets 90 are mounted to the mounting bar 72 by a set of U-bolts 92. A second set of U-bolts 94 is located on distal end 96 of the bracket 90. In the illustrated embodiment, the U-bolts 94 are oriented 90 degrees relative to the U-bolts 92. The spacing of the holes 98 in the bracket 90 for receiving the U-bolts 94 can be arranged so that the U-bolts 94 can be turned 90 degrees (parallel to the U-bolts 92) if required. The U-bolts 92 permit the entire bracket 90 and U-bolts 94 to be rotated to an angle corresponding to the orientation of the support structure on a shopping cart 102. Additionally, the U-bolts 92 permit the brackets 90 to slide laterally along the mounting bar 72 to accommodate cart basket support structures of different widths.

A wide variety of mounting assemblies can be utilized for mounting the passenger carrier 20 to a shopping or luggage cart 102 without departing from the present invention. For example, the mounting bar 72 can have a variety of non-circular cross-sections, such as rectangular, square, I-beam, etc. The function of the mounting bar 72 can be accomplished using two or more mounting bars of a variety of constructions. The mounting bars 72 may have a telescoping relationship with each other and/or the platform portion 26, and/or the cart basket support structure (see FIG. 7). Although U-bolts 92, 94 are convenient for mounting to tubular structures, there is no requirement that U-bolts be used and there may be advantages to using the variety of other bracket structures for mounting to tubular and non-tubular support structures on the shopping or luggage cart 102. For example, mounting holes can be formed in the cart basket support structure to which the mounting assembly is fastened.

As best illustrated in FIG. 2, the upper portion 24 of the passenger carrier 20 is in a first position 120. As illustrated in FIG. 3, the upper portions 24 pivots around axis of rotation 55 extending through first distal ends 57 (see FIG. 1) of the second reinforcing members 50 along path 27 to a second position 122; In the second position 122, an opening 124 is formed between the second reinforcing members 50 along the sides, the upper portion 24 along the top and the lower portion 22 along the bottom. The opening 124 is sized and positioned to receive a cart basket from another cart. In an alternate embodiment, the upper portion 24 could rotate downward (See FIG. 9) or sideways.

Figure 4:
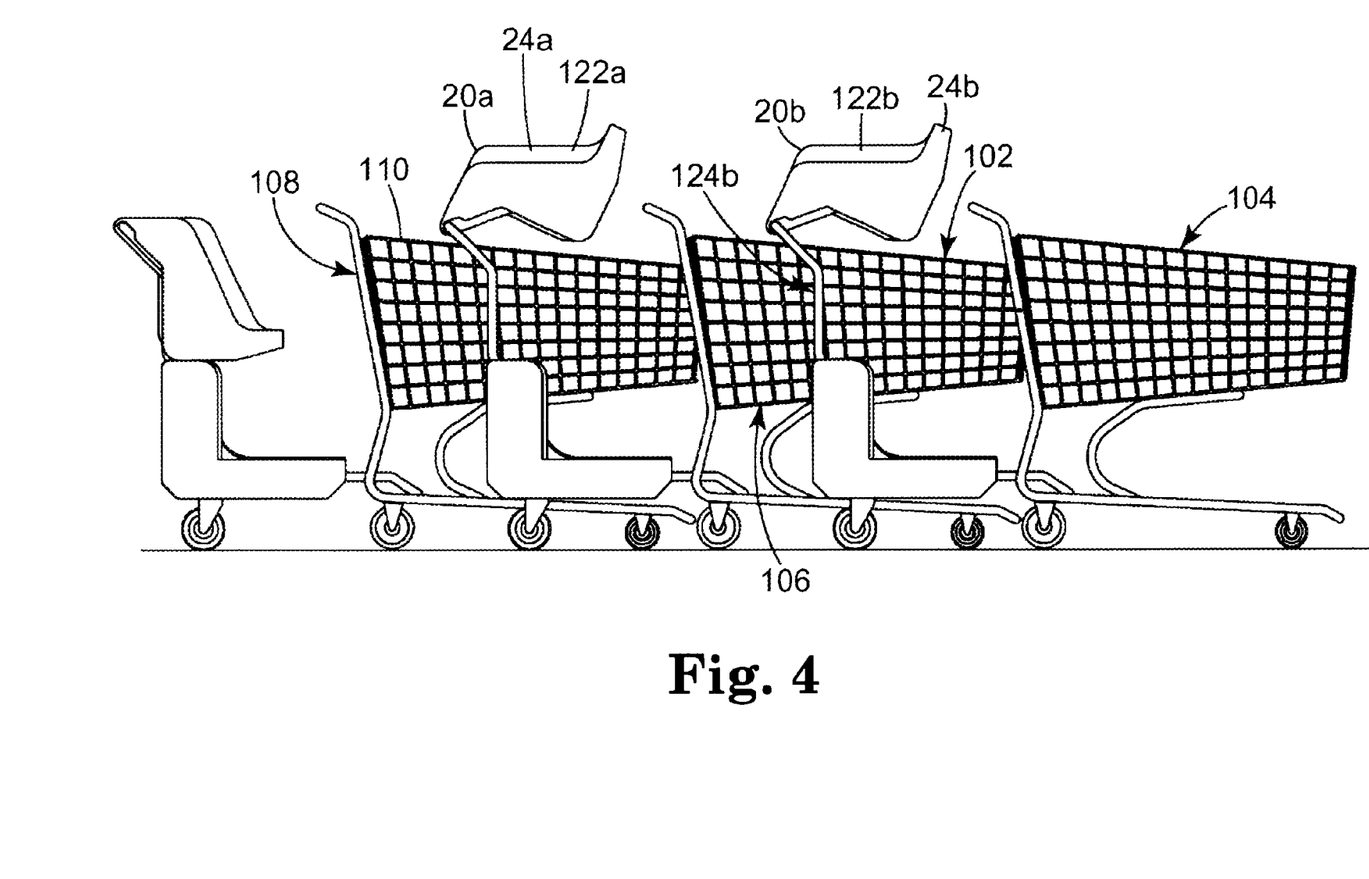
FIG. 4 is a side view of a group of passenger carriers and shopping carts in various nested configurations.

FIG. 4 illustrates the passenger carriers 20*a*, 20*b* illustrated in FIGS. 1–3 attached to shopping carts 102, 104, respectively, and arranged in a nested configuration. Cart basket 106 of the cart 102 is inserted into the opening 124*b* and the upper portion 24*b* is rotated to the second configuration 122*b*. Cart basket 110 on cart 108 is nested with the passenger carrier 20*a* as discussed above so that the upper portion 24*a* is in the second configuration 122*a*. Carts without a passenger carrier can also be nested with passenger carrier. Therefore, any combination of carts with or without the present passenger carrier can be arranged in a single row (serially) to form a nested configuration.

Figure 5:
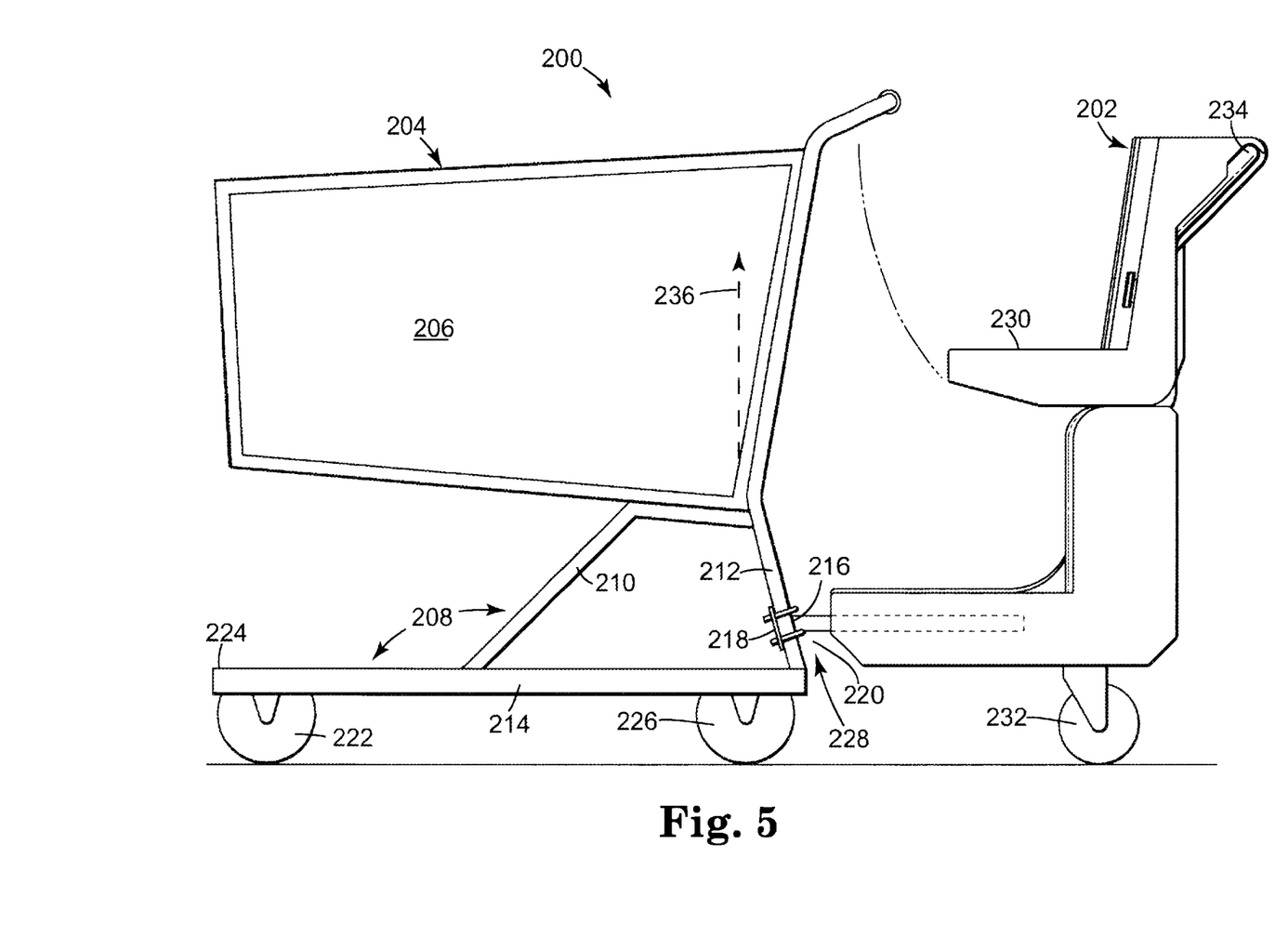
FIG. 5 is a side sectional view of another embodiment of a passenger carrier in accordance with the present invention.

FIG. 5 schematically illustrates the assembly 200 comprising a passenger carrier 202 and shopping cart 204 in accordance with the present invention. The shopping cart 204 has a cart basket 206 mounted to a support structure 208. The support structure 208 typically includes one or more upright members 210, 212 and one or more horizontal members 214. Since upright member 212 is not vertical, U-bolts 216 permit the bracket 218 to be rotated at a slight angle. Mounting assembly 220 can be designed to couple with any portion of the support structure 208 (i.e., 210, 221, 214 and/or the cart basket 206). The mounting assembly 220 rigidly attaches the passenger carrier 202 to the cart 204. As used herein, "rigid" refers to a structure that is not articulated or hinged, although flexure inherent in the materials used in the various components of the passenger carrier 202, mounting assembly 220 or cart 204 is likely.

Although the seat portion 230 is oriented generally toward the cart 204, it can alternately be oriented toward one side or the other. In yet another embodiment, a center divider (see FIG. 1) can be provided in the seat portion 230 that can be used as a back rest to permit the riders to face toward the opposite sides of the assembly 200.

The cart 204 include a first set of swivel caster wheels 222 on the front portion 224. A second set of non-swivel caster wheels 226 are located 228 near where the passenger carrier 202 attaches to the cart 204. A third set of swivel caster wheels 232 are located on the passenger carrier 202. The optimum configuration for steering the assembly 200 is where only one of the three sets of wheels are non-swivel caster wheels. If more than two sets of wheels are non-swivel casters, the assembly 200 can only be steered by sliding or dragging to one side or the other. If all of the sets of wheels are swivel caster wheels, then steering the assembly 200 will be difficult to control because only the force applied to the handle 234 by the operator will keep the assembly 200 from veering off course.

In one embodiment, the second set of wheels 226 at the location 228 are non-swivel caster wheels and the first set of wheels 222 at the front of the cart 224 are swivel caster wheels. When combined with the third set of swivel caster wheels 232 on the passenger carrier 202, the entire assembly can be steered around a vertical axis 236 located generally in the region near the non-swivel caster wheels 226. This configuration is desirable because the non-swivel caster wheels 226 are close to the center of mass of the assembly 200. Depending upon how the assembly 200 is steered, the vertical axis 236 can move anywhere between the second set of wheels 226 and/or slightly in front of or behind the second set of wheels 226.

In an alternate embodiment, it is possible that the first and second sets of wheels 222, 226 are swivel casters and the third set of wheels 232 supporting the passenger carrier 202 are non-swivel casters. In this embodiment, the entire assembly 200 would pivot around a vertical axis located near the non-swivel caster wheels 232. In order to steer the assembly 200, the user would need to overcome the inertia of both the cart 204 and the passenger carrier 202.

In yet another embodiment, the first set of wheels 222 can be non-swivel casters while the second set of wheels 226 and the third set of wheels 238 can e swivel caster wheels. In this embodiment, the assembly 200 would pivot around a vertical axis located generally near the front wheels 222. This configuration would permit the operator to steer the assembly 200 by pulling the passenger carrier 202 to one side or the other. The entire assembly 202 would pivot around a vertical axis located near the first set of wheels 222.

Figure 6:
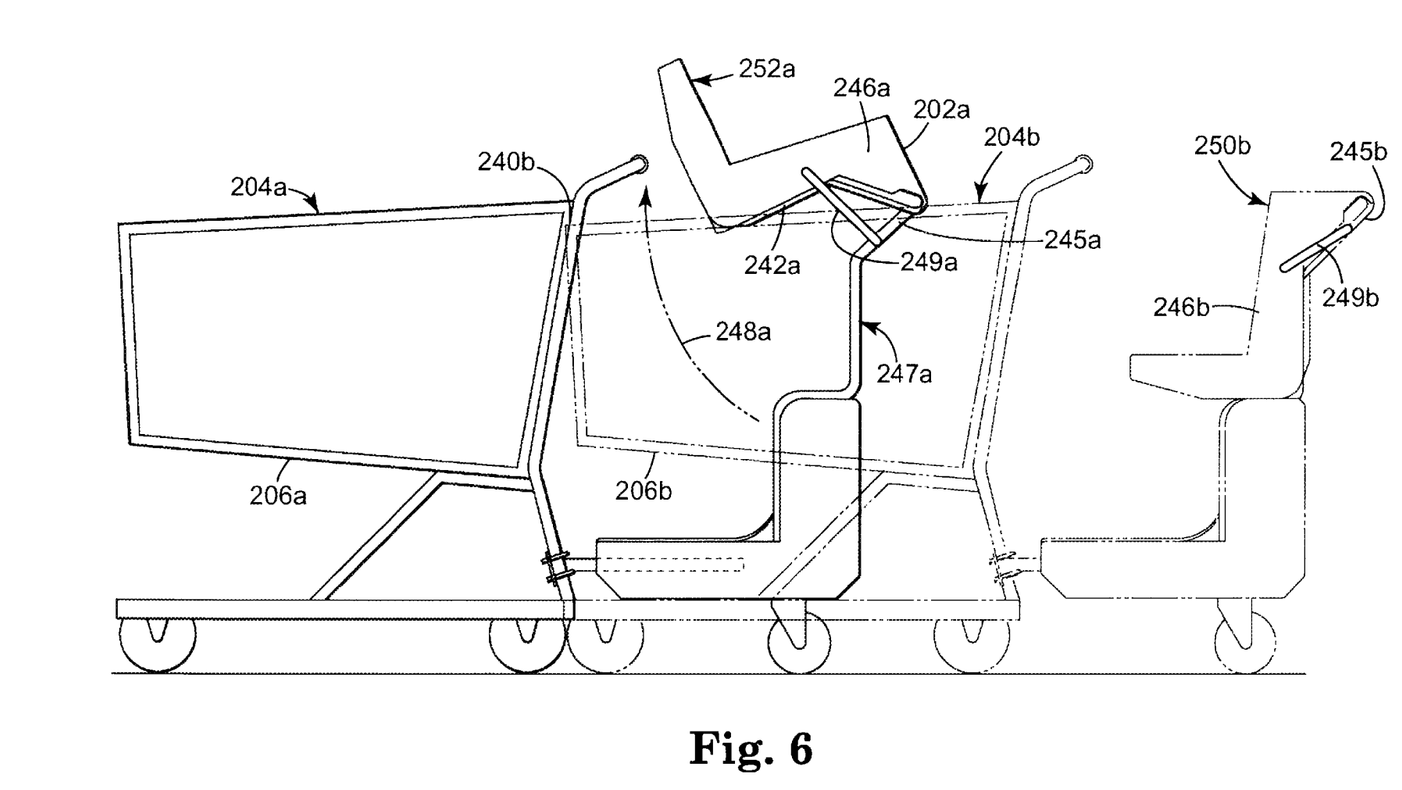
FIG. 6 is side view of two assemblies in accordance with the present invention in a nested configuration.

FIG. 6 is a perspective view of a first cart 204*a* with a cart basket 206*a* engaged with a second cart 204*b* in a nested configuration. As used herein, "nesting" or "nested" refers to interleaving or inserting a portion of a cart basket on a first shopping cart into a portion of the space occupied by a passenger carrier attached to a second shopping cart. As leading edge 240*b* of the cart basket 206*b* on the shopping cart 204*b* engages with rear surface 242*a* of the upper portion 246*a*, the upper portion 246*a* on the passenger carrier 202*a* rotates in a direction 248*a* to a second position 252*a*. Upper portion 246*b* illustrates the first position 250*b*. Rear surface 242*a* may optionally be reinforced to absorb the impact from the leading edge 240*b* of the cart basket 206*b*. Rotation of the upper portion 246*a* forms 247*a* opening (see e.g., FIG. 3) in the passenger carrier 202*a* large enough to receive the cart basket 206*b* in a nested configuration.

As cart basket 206*b* is disengaged from the passenger carrier 202*a*, the upper portion 246*a* rotates in a direction opposite 248*a* back to the first position (see e.g, 250*b*). Once the cart basket 206*b* is disengaged, the upper portion 246*a* is free to fall the remaining distance to the first position. In one embodiment, one or more biasing members 249a, 249b are provided to control the movement of the upper portions 246a, 246b from the second position to the first position. As used herein, "control the movement" refers to slowing the rate of movement from the second position to the first position. The biasing members 249a, 249b can be pneumatic or hydraulic cylinders, springs, elastomeric members, and the like. The location of the biasing members can also vary considerably. In the illustrated embodiment, the biasing members 249a, 249b are gas springs pivotally attached to the upper portions 246a, 246b at one end and reinforcing member 245a, 245b at the other end, respectively. In another embodiment, the biasing member is a coil spring located at the interface of the first distal ends 57 of the second reinforcing members 50 and the recesses 52 (see FIG. 1).

Figure 7:
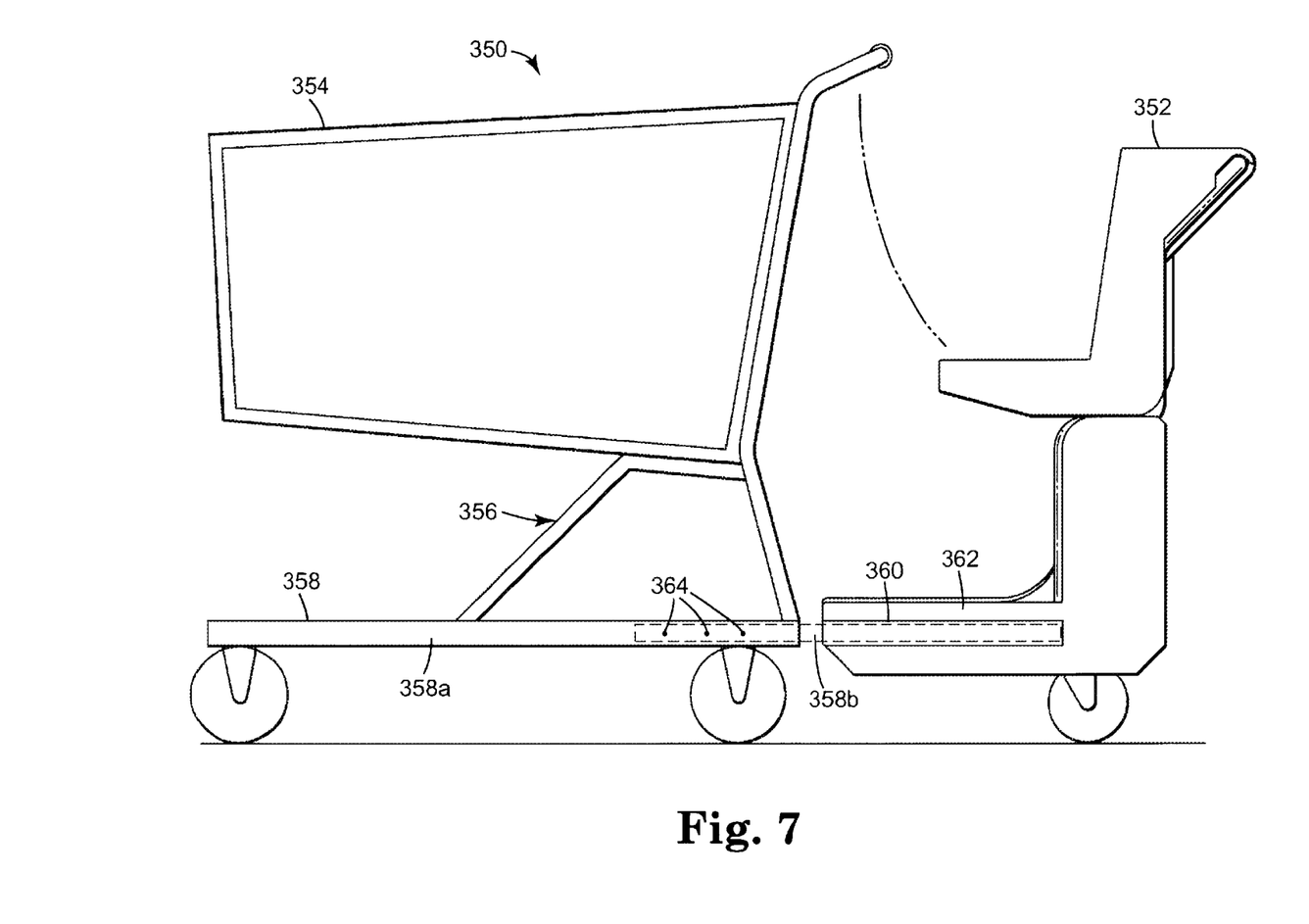
FIG. 7 is a side view of a passenger carrier and cart basket having a common support structure in accordance with the present invention.

FIG. 7 is a side view of an assembly 350 comprising a passenger carrier 352 and cart 354. Support structure 356 includes a horizontal member 358 that supports both the cart 354 and the passenger carrier 352. The horizontal member 358 can be constructed from one or more discrete pieces. In the illustrated embodiment, horizontal member 358 extends from the cart 354 and into recess 360 formed in platform portion 362 of the passenger carrier 352.

In an alternate embodiment, horizontal member 358 comprises the first portion 358a that supports the cart 354. The second portions 358b can telescopically engage with the first portion 358a and/or the recess 360. The second portion 358b is retained to the first portion 358a using appropriate fasteners 364. Consequently, the cart 354 can be separated from the passenger carrier 352 for shipping or for use as a separate component. This approach has the advantage of permitting the manufacturer to produce a single cart 354 with a horizontal member 358a having an opening sized to optionally engage with portion 358b.

Figure 8:
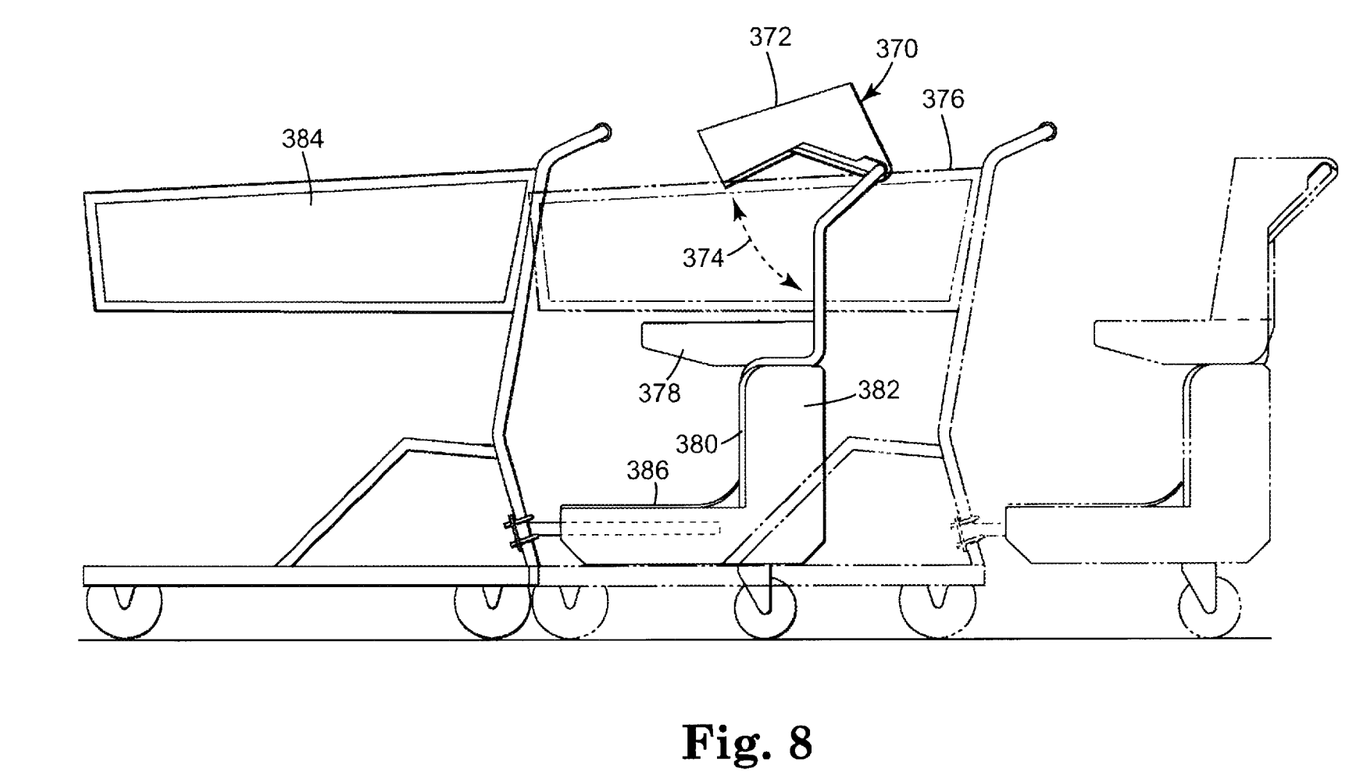
FIG. 8 is side view of an alternate embodiment of the present passenger carrier and cart basket in a nested configuration in accordance with the present invention.

FIG. 8 is a side view of an alternate passenger carrier 370 in accordance with the present invention. In the embodiment illustrated in FIG. 8, only the back rest portion 372 rotates along the path 374 to permit nesting with another cart basket 376. Seat portion 378 remains fixed to the first and second reinforcing member 380, 382, respectively. Although the embodiment of FIG. 8 illustrates a cart basket 384 that is not as deep as those illustrated in FIG. 4 and 5, it is possible to lower the height of the seat portion 378 relative to the platform portion 386 to accommodate a cart baskets 376, 384 of greater depth.

Figure 9:
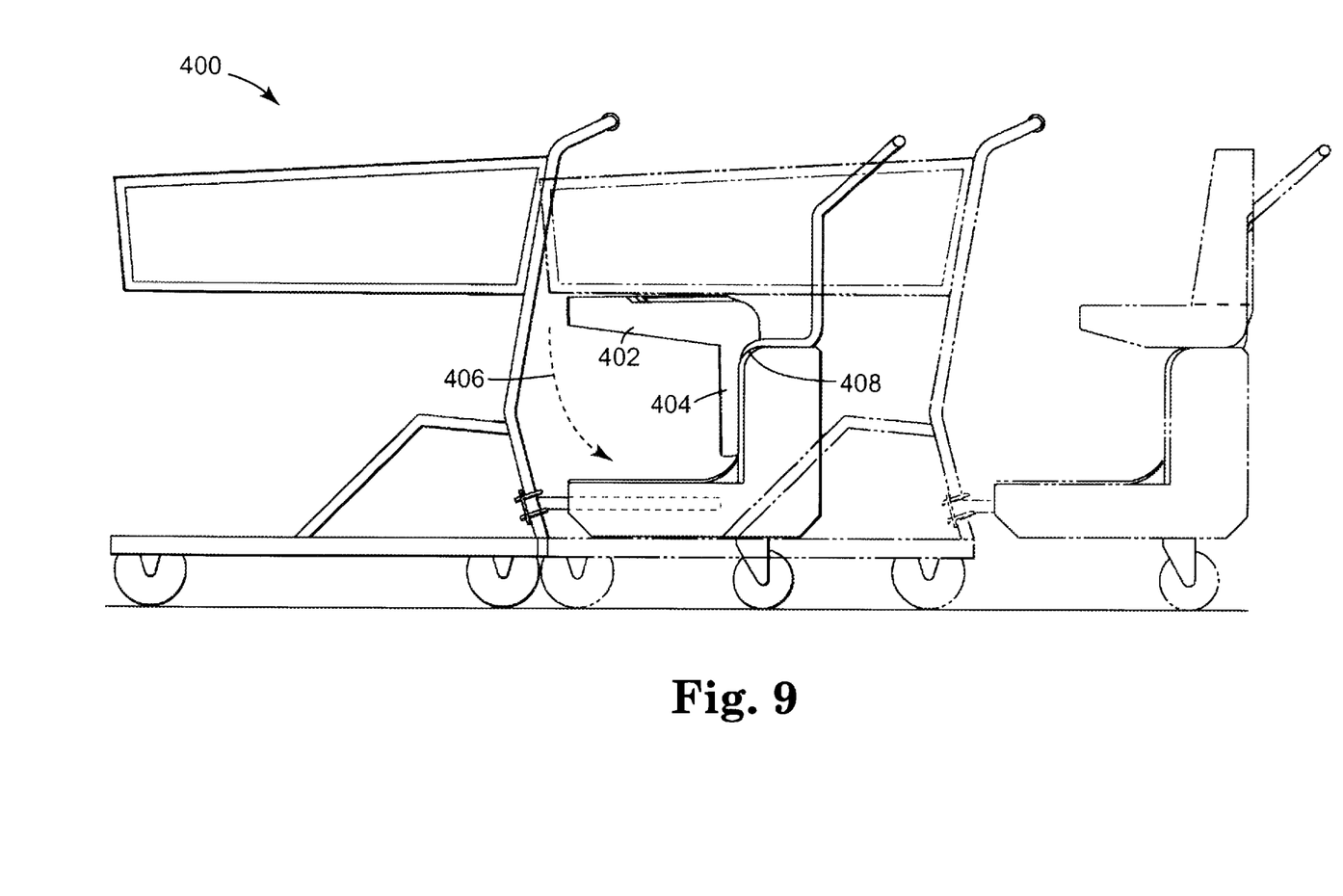
FIG. 9 is a side view of another alternate embodiment of the present passenger carrier and cart basket in a nested configuration.

FIG. 9 illustrates an alternate passenger carrier 400 in accordance with the present invention. In the embodiment illustrated in FIG. 9, the back rest portion 402 and seat portion 404 rotate downward in a direction 406 around a pivot point 408. The pivot point 408 preferably includes a biasing mechanism, such as a spring to bias the back rest portion 402 and seat portion 404 into the upright position. A latch mechanism (not shown) may optionally be used to retain the back rest portion 402 and seat portion 404 in the upright position until nesting is required.

All Patents referred to in the Background section and the Detailed Description section are hereby incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. An apparatus comprising a passenger carrier having a seat portion and a cart basket, the apparatus comprising a first set of wheels supporting the cart basket, a second set of wheels supporting the apparatus generally near a location where the passenger carrier is connected to the cart basket and a third set of wheels supporting the passenger carrier, the first set of wheels and the third set of wheels comprise swivel casters and the second set of wheels comprise non-swivel caster wheels, the passenger carrier comprising an upper portion in a first position that can be displaced to a second position to form an opening sized to receive a front portion of another cart basket in a nested configuration.

2. The apparatus of claim 1 wherein the cart basket comprises a shopping cart with the first set of wheels and the second set of wheels.

3. The apparatus of claim 1 wherein the cart basket comprises a shopping cart releasably attached to the passenger carrier.

4. The apparatus of claim 1 wherein connector bars extending between the passenger carrier and the cart basket comprise an extension of one of the cart basket or the passenger carrier.

5. The apparatus of claim 1 wherein connector bars extending between the passenger carrier and the cart basket telescopically engage with at least one of the passenger carrier or the cart basket.

6. The apparatus of claim 1 wherein the connected passenger carrier and cart basket comprise a unitary frame structure.

7. The apparatus of claim 1 wherein the upper portion rotates around an axis of rotation on the passenger carrier between the first position and the second position.

8. The apparatus of claim 1 wherein the upper portion rotates upward relative to the passenger carrier to the second position.

9. The apparatus of claim 1 wherein the upper portion rotates downward relative to the passenger carrier to the second position.

10. The apparatus of claim 9 wherein the upper portion is biased toward the first position.

11. The apparatus of claim 1 wherein the upper portion comprises a back rest portion and a seat portion.

12. The apparatus of claim 1 wherein the upper portion comprises a back rest portion.

13. The apparatus of claim 1 wherein the seat portion on the passenger carrier is oriented toward the cart basket.

14. The apparatus of claim 1 wherein the seat portion on the passenger carrier is oriented toward sides of the cart basket.

15. The apparatus of claim 1 comprising a biasing member adapted to control the movement of the upper portion from the second position to the first position.

16. The apparatus of claim 1 wherein the passenger carrier comprises a platform extending forward of the seat portion.

17. The apparatus of claim 1 wherein the passenger carrier is maintained a fixed distance from the cart basket.

18. The apparatus of claim 1 wherein the passenger carrier extends behind the cart basket to provide additional leverage for maneuvering the cart basket and passenger carrier.

19. The apparatus of claim 1 wherein the passenger carrier does not significantly reduce the overall functionality of the cart basket.

20. The apparatus of claim 1 wherein the passenger carrier and the cart basket pivot around a vertical axis located generally near the second set of wheels.

21. The apparatus of claim 1 wherein the passenger carrier and the cart basket pivot around a vertical axis located generally between the first set of wheels and the third set of wheels.

22. The apparatus of claim 1 wherein the passenger carrier and the cart basket pivot around a vertical axis located in a region generally bounded by the first set of wheels and the third set of wheels.

23. An apparatus comprising a passenger carrier attached to a cart, the cart comprising a support structure comprising at least two swivel caster wheels supporting a cart basket, the passenger carrier comprising a seat portion and at least one swivel caster passenger carrier wheel, the apparatus comprising a pair of intermediate non-swivel caster wheels located generally where the passenger carrier is connected to the cart the passenger carrier comprising an upper portion in a first position that can be displaced to a second position to form an opening sized to receive a front portion of another cart basket in a nested configuration.

24. The apparatus of claim, 23 wherein the passenger carrier and cart pivot as a single structure.

25. The apparatus of claim 23 wherein the upper portion rotates around an axis of rotation on the passenger carrier between the first position and the second position.

26. The apparatus of claim 23 wherein the upper portion rotates downward relative to the passenger carrier to the second position.

27. The apparatus of claim 23 wherein the upper portion is biased toward the first position.

28. The apparatus of claim 23 wherein the upper portion comprises a back rest portion and a seat portion.

29. The apparatus of claim 23 wherein the passenger carrier and cart pivot around a vertical axis located generally between the two front swivel caster wheels of the cart and the at least one swivel caster passenger carrier wheel.

30. A method of nesting an apparatus comprising a passenger carrier and a cart comprising the steps of:

providing a first apparatus comprising passenger carrier having a seat portion and cart, the first apparatus comprising a first set of wheels supporting the cart basket, a second set of wheel supporting the apparatus generally near a location where the passenger carrier is connected to the cart basket and a third set of wheels supporting the passenger carrier, the first set of wheels and the third set of wheels comprise swivel casters and the second set of wheels comprise non-swivel caster wheels, the apparatus comprising an upper portion in a first position; and pressing a second cart basket against the upper portion so that the upper portion is displaced to a second position forming an opening sized to receive a front portion of the second cart basket.

31. The method of claim 30 comprising the step of rotating the upper portion upward relative to the apparatus to the second position.

32. The method of claim 30 comprising the step of rotating the upper portion downward relative to the apparatus to the second position.

33. The method of claim 32 comprising the step of biasing the upper portion toward the first position.

34. The method of claim 30 wherein the upper portion comprises a back rest portion and a seat portion.

35. The method of claim 30 comprising the step of slowing the rate of movement of the upper portion from the second position to the first position.

36. An apparatus comprising a passenger carrier having a seat portion and a cart basket, a first set of wheels supporting the cart basket, a second set of wheels supporting the apparatus generally near a location where the passenger carrier is connected to the cart basket, and a third set of wheels supporting the passenger carrier, only one of the first set of wheels, the second set of wheels and the third set of wheels comprise non-swivel casters wheels such that the passenger carrier and the cart basket pivot around a vertical axis located generally between the first set of wheels and the third set of wheels, the apparatus comprising an upper portion in a first position that can be displaced to a second position to form an opening sized to receive a front portion of another cart basket in a nested configuration.

37. An apparatus comprising a passenger carrier attached to a cart, the cart comprising a support structure and a cart basket, the passenger carrier comprising a seat portion, the apparatus comprising a first set of swivel caster wheels near a front portion of the apparatus, a second set of non-swivel caster wheels located generally where the passenger carrier is connected to the cart, and a third set of swivel caster wheels located near a rear portion of the apparatus, the passenger carrier comprising an upper portion in a first position that can be displaced to a second position to form an opening sized to receive a front portion of another cart basket in a nested configuration.

* * * * *